United States Patent
Symes et al.

(10) Patent No.: US 8,595,280 B2
(45) Date of Patent: Nov. 26, 2013

(54) APPARATUS AND METHOD FOR PERFORMING MULTIPLY-ACCUMULATE OPERATIONS

(75) Inventors: Dominic Hugo Symes, Cambridge (GB); Mladen Wilder, Cambridge (GB); Guy Larri, Cambridge (GB)

(73) Assignee: ARM Limited, Cambridge (GB)

( * ) Notice: Subject to any disclaimer, the term of this patent is extended or adjusted under 35 U.S.C. 154(b) by 565 days.

(21) Appl. No.: 12/926,171

(22) Filed: Oct. 29, 2010

(65) Prior Publication Data

US 2011/0106871 A1 May 5, 2011

(30) Foreign Application Priority Data

Oct. 30, 2009 (GB) .................................. 0919120.6

(51) Int. Cl.
   *G06F 7/38* (2006.01)
(52) U.S. Cl.
   USPC .......................................................... 708/523
(58) Field of Classification Search
   USPC ........................................ 708/620–632, 523
   See application file for complete search history.

(56) References Cited

U.S. PATENT DOCUMENTS

| 5,796,645 A | 8/1998 | Peh et al. | |
|---|---|---|---|
| 7,437,401 B2 * | 10/2008 | Zheng et al. | 708/523 |
| 2010/0169404 A1 * | 7/2010 | Zheng et al. | 708/523 |

FOREIGN PATENT DOCUMENTS

| EP | 0 718 757 | 10/1997 |
|---|---|---|
| EP | 1 710 691 | 10/2006 |
| GB | 2 291 515 | 1/1996 |

* cited by examiner

*Primary Examiner* — Tan V. Mai
(74) *Attorney, Agent, or Firm* — Nixon & Vanderhye P.C.

(57) ABSTRACT

A data processing apparatus and method for performing multiply-accumulate operations is provided. The data processing apparatus includes data processing circuitry responsive to control signals to perform data processing operations on at least one input data element. Instruction decoder circuitry is responsive to a predicated multiply-accumulate instruction specifying as input operands a first input data element, a second input data element, and a predicate value, to generate control signals to control the data processing circuitry to perform a multiply-accumulate operation by: multiplying said first input data element and said second input data element to produce a multiplication data element; if the predicate value has a first value, producing a result accumulate data element by adding the multiplication data element to an initial accumulate data element; and if the predicate value has a second value, producing the result accumulate data element by subtracting the multiplication data element from the initial accumulate data element. Such an approach provides a particularly efficient mechanism for performing complex sequences of multiply-add and multiply-subtract operations, facilitating improvements in performance, energy consumption and code density when compared with known prior art techniques.

27 Claims, 6 Drawing Sheets

APPARATUS AND METHOD FOR PERFORMING MULTIPLY-ACCUMULATE OPERATIONS

This application claims priority to GB Application No. 0919120.6 filed 30 Oct. 2009, the entire contents of which are incorporated herein by reference.

BACKGROUND OF THE INVENTION

1. Field of the Invention

The present invention relates to an apparatus and method for performing multiply-accumulate (MAC) operations.

2. Background of the Invention

Multiply-accumulate (MAC) operations are used frequently in data processing systems. A MAC operation can take the form of A+B*C or A−B*C. The multiplication operation B*C is typically performed multiple times for different values of B and C, with each multiplication result then being added (or subtracted) from the running accumulate value A.

Dedicated MAC circuits are often provided within a data processing system to optimise performance of back-to-back MAC operations. Such MAC circuitry may be provided within a scalar processing circuit, where sequences of multiply-accumulate instructions are executed one after the other to execute the required iterations of the multiply-accumulate operation. However, one known approach for accelerating the performance of such an operation is to employ a SIMD (Single Instruction Multiple Data) approach. In accordance with the SIMD approach, multiple of the data elements are place side-by-side within a register, and then the required operation is performed in parallel on those data elements within multiple lanes of parallel processing. Considering the operations required to generate a single multiply-accumulate result, it will be appreciated from the above discussion that a plurality of separate multiply operations are required, and by using SIMD data processing circuitry, a plurality of those required multiplications can be performed in parallel to increase the throughput of the multiply-accumulate operation. As with the scalar circuitry, within SIMD data processing circuitry, a dedicated MAC circuit can be provided for optimising the performance of multiply-accumulate operations.

One type of digital signal processing operation which frequently uses MAC operations is a filter operation. When using a dedicated MAC unit, it is possible to perform complex filter operations relatively quickly. One particular example of where such filter operations are used is when comparing a received radio signal with a pilot signal, the pilot signal being used as a known reference signal by the receiver. The pilot signal will typically alternate between a known positive amplitude and a known negative amplitude to define a known pilot waveform. When performing such a filter operation, it is necessary to perform multiply-add and multiply-subtract operations throughout the filtering operation, with the form of the pilot signal at any particular point in time determining whether a multiply-add or a multiply-subtract operation is required.

When seeking to perform such an operation within a scalar MAC circuit, it would be possible to construct a sequence of multiply-add instructions and multiply-subtract instructions that when executed perform the required operation. However, a decision as to the exact sequence of multiply-add and multiply-subtract operations required needs to be made at compile time rather than at run time, and hence the sequence can only be constructed for a particular pilot signal. Such an approach hence lacks flexibility, and is undesirable from a code density point of view.

More typically, it may be desired to perform such a filter operation within a SIMD MAC circuit. In such situations, a multiply-add instruction can be issued to cause a plurality of multiply-add operations to be performed in parallel within multiple lanes of processing, and similarly a multiply-subtract instruction can be issued to cause a plurality of multiply-subtract operations to be performed in parallel within multiple lanes of parallel processing. To perform the earlier-described filter operations, it will typically be necessary to use one form of instruction, for example a multiply-add instruction, and then to encode as a vector of data elements the amplitude of the pilot signal at predetermined time intervals, i.e. directly identifying both positive and negative amplitude values. This requires a lot of space in memory to encode the pilot information, and those large vectors of information would need to be recalculated each time the pilot signal is changed. Furthermore, even if the pilot signals stayed the same, but the amplitude of the pilot signal changed due to variations in reception characteristics, the vectors within the memory would need to be reprogrammed.

If alternatively it were decided to try and make use of both the multiply-add instruction and the multiply-subtract instruction, this would typically give rise to some data rearrangement issues and also code density problems.

Hence, whilst it is desirable to use a dedicated MAC circuit to perform filter operations, it is difficult to perform certain types of filter operation efficiently using known MAC techniques.

An alternative approach which could be taken when one of the multiplication data elements (for example the element C referred to earlier) is of constant size, but only the sign changes (as is in fact the case for the earlier described pilot signal), would be to perform a sequence of additions and subtractions within an adder unit, followed by a single multiplication of the result by the constant amplitude value. Within such adder units, it is known to provide a predicated add/subtract instruction, which will either perform an addition of two numbers, or a subtraction of two numbers dependent on a predicate value provided in the instruction. Whilst such an instruction would provide flexibility for performing a sequence of addition and subtraction operations, adder circuitry is not typically optimised in hardware for back-to-back accumulation of the results for a sequence of add and subtract operations, and hence would not provide the performance that dedicated MAC circuitry would provide. Furthermore, the running accumulate value within an adder unit is typically held in the same size register as the input operands, and accordingly a great deal of care would be needed to ensure that the running accumulate value did not overflow or underflow, typically this requiring the use of various evaluate and shift type operations throughout the accumulate process, further impacting performance. In contrast, in a MAC unit, the accumulate value is typically held in a register that is larger than the input operands, thereby allowing a higher precision accumulate value to be maintained without risk of overflow or underflow. Furthermore, when using an adder circuit, then following the required additions, it would be necessary for a separate multiply instruction to be executed to perform the required multiplication to complete the filter operation.

Accordingly, it has generally been considered impractical to seek to perform such filter operations within separate adder circuitry, followed by a multiplication within separate multiplier circuitry.

Accordingly, it would be desirable to provide a technique which enabled multiply-accumulate operations to be efficiently performed within multiply-accumulate circuitry, in situations where variable sequences of multiply-add and multiply-subtract operations are required, as for example is the case in the earlier described filter operations.

SUMMARY OF THE INVENTION

Viewed from a first aspect, the present invention provides a data processing apparatus comprising: data processing circuitry responsive to control signals to perform data processing operations on at least one input data element; instruction decoder circuitry coupled to said data processing circuitry and responsive to program instructions to generate said control signals; said instruction decoder circuitry being responsive to a predicated multiply-accumulate instruction specifying as input operands a first input data element, a second input data element, and a predicate value, to generate control signals to control said data processing circuitry to perform a multiple-accumulate operation by: multiplying said first input data element and said second input data element to produce a multiplication data element; if the predicate value has a first value, producing a result accumulate data element by adding the multiplication data element to an initial accumulate data element; and if the predicate value has a second value, producing the result accumulate data element by subtracting the multiplication data element from the initial accumulate data element.

In accordance with the present invention, a predicated multiply-accumulate instruction is provided which when decoded by instruction decoder circuitry, causes the data processing circuitry to perform either a multiply-add or a multiply-subtract operation dependent on the value of a predicate value specified by the instruction. Using one or more of these predicated multiply-accumulate instructions, it is then possible to perform complex filter operations within a dedicated MAC circuit in an efficient manner. In particular, the decision as to whether a multiply-add or a multiply-subtract operation is required can be taken at run time, rather than compile time, leading to significant code density improvements. Further, the use of the predicate value can reduce the amount of memory required to hold details of the input data elements to be multiplied, particularly where one of the data elements is reused in positive or negative sign form across a plurality of multiply-accumulate operations. Instead of having to separately store the value of that data element for each multiply-accumulate operation, the magnitude can be stored in a single scalar register, and a separate predicate value can be provided for each multiply-accumulate operation to identify whether an addition or a subtraction is required, resulting in more efficient use of memory resources.

The approach of the present invention enables the performance benefits of using a dedicated MAC unit to be achieved when performing sequences of multiply-accumulate operations where combinations of multiply-add and multiply-subtract operations are required. When employing the approach of the present invention, significant reductions in energy consumption can be achieved when compared with known prior art techniques.

In one embodiment, the data processing circuitry further comprises at least one register bank for storing said input operands, wherein said predicated multiply-accumulate instruction identifies a register of the at least one register bank containing said predicate value. A dedicated predicate register bank can be provided, or alternatively the predicate values can be stored within registers of a general purpose register bank.

Whilst the predicated multiply-accumulate instruction of one embodiment of the present invention may be executed within scalar processing circuitry, in one embodiment the data processing circuitry is SIMD data processing circuitry providing N lanes of parallel processing, where N is an integer greater than 1, and the SIMD data processing circuitry is responsive to the control signals to perform a data processing operation in parallel in each of said N lanes of parallel processing. In such embodiments, said predicated multiply-accumulate instruction specifies as input operands a plurality of said first input data elements forming a first vector, and said instruction decoder circuitry is responsive to the predicated multiply-accumulate instruction to generate control signals to control said data processing circuitry to perform in parallel said multiply-accumulate operation in each of said N lanes of parallel processing, such that the first input data element from said first vector that is selected for input to the multiply-accumulate operation is dependent on the lane of parallel processing in which that multiply-accumulate operation is being performed. Such an approach can provide significant performance benefits when compared with performance of MAC operations within a scalar processor, by allowing multiple iterations of the multiply-accumulate operation to be performed in parallel.

The predicated multiply-accumulate instruction may in one embodiment specify a single predicate value to be applied across all of the lanes, or may specify multiple predicate values, allowing for example separate predicate values to be specified for each lane, thereby providing a great deal of flexibility in the use of the predicated multiply-accumulate instruction.

In one embodiment, said predicated multiply-accumulate instruction further specifies as input operands a plurality of said second input data elements forming a second vector, and the second input data element from said second vector that is selected for input to the multiply-accumulate operation is dependent on the lane of parallel processing in which that multiply-accumulate operation is being performed.

However, in an alternative embodiment, said predicated multiply-accumulate instruction further specifies as input operands a scalar second input data element which is then replicated within the data processing circuitry to form a second vector, whereby the same second input data element is used in each lane of parallel processing in which said multiply-accumulate operation is being performed. Such an approach may for example be used when performing the earlier-described filter operation with respect to a pilot signal, where the second input data element may specify the amplitude of the pilot signal (which typically will be constant), with the predicate value then identifying the sign of the amplitude value, and hence whether a multiply-add or a multiply-subtract operation is required at any particular point in the filter process.

In one embodiment, said predicated multiply-accumulate instruction specifies as input operands a plurality of said predicate values forming a third vector, and the predicate value from said third vector that is selected for input to the multiply-accumulate operation is dependent on the lane of parallel processing in which that multiply-accumulate operation is being performed. The number of predicate values in the third vector can vary dependent on implementation. For example, certain lanes can be grouped, and controlled with the same predicate value. However, in one embodiment the third vector specifies N predicate values, such that within each of said N lanes of parallel processing the multiply-accumulate operation can be independently configured to perform a multiply-add or a multiply-subtract operation. This hence provides significant flexibility in how the predicated multiply-accumulate instruction is used, allowing complex sequences of multiply-accumulate operations to be readily implemented.

The initial accumulate data element may be specified in a variety of ways. For example, in one embodiment, the predicated multiply-accumulate instruction may specify as an input operand the initial accumulate data element. Alternatively, the initial accumulate data element may take some predetermined value, in one particular example that predetermined value being zero, i.e. there is no initial accumulate data element.

In one embodiment where the predicated multiply-accumulate instruction is executed within SIMD data processing circuitry, the predicated multiply-accumulate instruction specifies as input operands a plurality of said initial accumulate data elements forming a fourth vector, and the initial accumulate data element from said fourth vector that is selected for input to the multiply-accumulate operation is dependent on the lane of parallel processing in which that multiply-accumulate operation is being performed.

In one particular embodiment, each of the first, second and fourth vectors has N data elements. Further, in one embodiment, the third vector has N predicate values.

In one embodiment, each first input data element comprises X bits, each second input data element comprises Y bits, and each initial accumulate data element is at least X+Y bits in size. Often, the data processing circuitry will maintain the accumulate data element within a register that is larger than the register providing the first and second input data elements so that each accumulate data element is greater than X+Y bits in size. In one particular example, X and Y are each 16 bits, and the accumulate data element is held in a 40-bit register. By such an approach, a high precision accumulate result can be maintained without risk of overflow, and hence without the need to incorporate additional operations to monitor for overflow situations and to perform associated shifting when an overflow condition is identified.

Whilst the first data elements and the second data elements do not need to be of the same size, in one embodiment X does equal Y, and accordingly the first and second data elements are of the same size.

In one embodiment, the at least one register bank that contains the predicate value also comprises an input data element register bank comprising input registers for storing said first and second input data elements, and an accumulate register bank having accumulate registers for storing each initial accumulate data element and result accumulate data element. As mentioned earlier, it is often the case that the accumulate registers will be larger than the input registers.

In one embodiment, the first input data element, second input data element, and accumulate data element are all real numbers. However, in an alternative embodiment, at least one of the first input data element and the second input data element are complex numbers that comprise real and imaginary parts, and the multiply accumulate operation performed by the data processing circuitry is a complex multiply-accumulate operation producing as the result accumulate data element a complex number having real and imaginary parts.

In one embodiment, only one of the first input data element and second input data element are complex numbers. For example, the first input data element may be a complex number whilst the second input data element may provide a coefficient as a real number. In one such embodiment, the coefficient data element may be converted into complex form before performing the complex multiply-accumulate operation.

In another embodiment both the first input data element and the second input data element are complex numbers that comprise real and imaginary parts.

In one embodiment, the complex multiply-accumulate operation involves performance of a sequence of multiply, add and subtract operations in order to produce real and imaginary parts of the corresponding complex result accumulate data element.

In one embodiment, a single predicate value can be provided to control the multiply-accumulate operation performed in respect of both the real and imaginary parts of corresponding first and second data elements. However, in an alternative embodiment, the predicate value comprises at least two predicate values used to control different parts of the complex multiply-accumulate operation.

In one example embodiment, the predicate value comprises a first predicate value for the multiply-accumulate operation performed to produce the real part of the complex result accumulate data element, and a second predicate value for the multiply-accumulate operation performed to produce the imaginary part of the complex result accumulate data element. This provides further flexibility in the use of the predicated multiply-accumulate instruction in association with complex numbers.

In another example embodiment, both the multiply-accumulate operation performed to produce the real part of the complex result accumulate data element and the multiply-accumulate operation performed to produce the imaginary part of the complex result accumulate data element comprise first and second multiply operations, and the predicate value comprises a first predicate value for the first multiply operation and a second predicate value for the second multiply operation. This also provides further flexibility in the use of the predicated multiply-accumulate instruction in association with complex numbers.

In an alternative embodiment, at least one of the first input data element and the second input data element are floating point numbers, and the multiply accumulate operation performed by the data processing circuitry is a floating point multiply-accumulate operation producing as the result accumulate data element a floating point number. In such embodiments, the data processing circuitry will typically include floating point multiplication and addition circuitry in order to perform the required multiply-accumulate operations.

In one embodiment, only one of the first input data element and the second input data element is a floating point number, and the other input data element is a fixed point number. However, in one embodiment both of the first input data element and the second input data element are floating point numbers.

Viewed from a second aspect, the present invention provides a method of processing data using data processing circuitry responsive to control signals to perform data processing operations on at least one input data element and instruction decoder circuitry coupled to said data processing circuitry and responsive to program instructions to generate said control signals, the method comprising the steps of: decoding a predicated multiply-accumulate instruction specifying as input operands a first input data element, a second input data element, and a predicate value, in order to generate control signals; and controlling said data processing circuitry using said control signals to perform a multiple-accumulate operation by: multiplying said first input data element and said second input data element to produce a multiplication data element; if the predicate value has a first value, producing a result accumulate data element by adding the multiplication data element to an initial accumulate data element; and if the predicate value has a second value, producing the result accumulate data element by subtracting the multiplication data element from the initial accumulate data element.

Viewed from a third aspect, the present invention provides a computer program product comprising at least one predicated multiply-accumulate instruction which, when run on a data processor, controls the data processor to perform the steps of the method in accordance with the second aspect of the present invention.

Viewed from a fourth aspect, the present invention provides a virtual machine implementation of a data processing apparatus, said virtual machine implementation being responsive to a predicated multiply-accumulate instruction specifying as input operands a first input data element, a second input data element, and a predicate value, to perform a multiple-accumulate operation by: multiplying said first input data element and said second input data element to produce a multiplication data element; if the predicate value has a first value, producing a result accumulate data element by adding the multiplication data element to an initial accumulate data element; and if the predicate value has a second value, producing the result accumulate data element by subtracting the multiplication data element from the initial accumulate data element.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

In accordance with embodiments of the present invention, a predicated multiply-accumulate (predicated MAC) instruction is provided. For a scalar version of the instruction intended to be executed on scalar processing circuitry, the instruction takes as input operands a first input data element, a second input data element and a predicate value used to control whether a multiply-add or a multiply-subtract operation is performed when the instruction is executed. Optionally, a predicated MAC instruction may also take as an input operand an initial multiply-accumulate data element (also referred to herein as an initial accumulate data element).

However, for the purposes of describing one embodiment of the present invention, it will be assumed that the predicated multiply-accumulate instruction is intended to be executed within SIMD circuitry in order to perform a plurality of multiply-accumulate operations in parallel. In such embodiments, the predicated MAC instruction takes as input operands a first vector of first input data elements (va), a second vector of second input data elements (vb) and a vector of predicate values (vp). Optionally, the predicated MAC instruction may also take as an input operand a vector of initial accumulate data elements (vacc). Whilst in one embodiment the second vector is stored directly within a SIMD register identified by the predicated MAC instruction, in an alternative embodiment the predicated MAC instruction may specify a single scalar value as the second input data element, and the second vector can be constructed by replicating that single scalar value across the multiple lanes of parallel processing existing within the SIMD circuitry.

In one embodiment, all vectors have the same number of elements, referred to herein as N, but the data elements in each vector may have different widths. For example, in one embodiment, each data element in the vector accumulator is at least 32-bits wide, whilst the data elements in the input vectors va and vb are 16-bits wide. The elements in the predicate vector need only be one bit wide to specify whether an add or a subtract operation is required in the corresponding lane of parallel processing.

Figure 1:
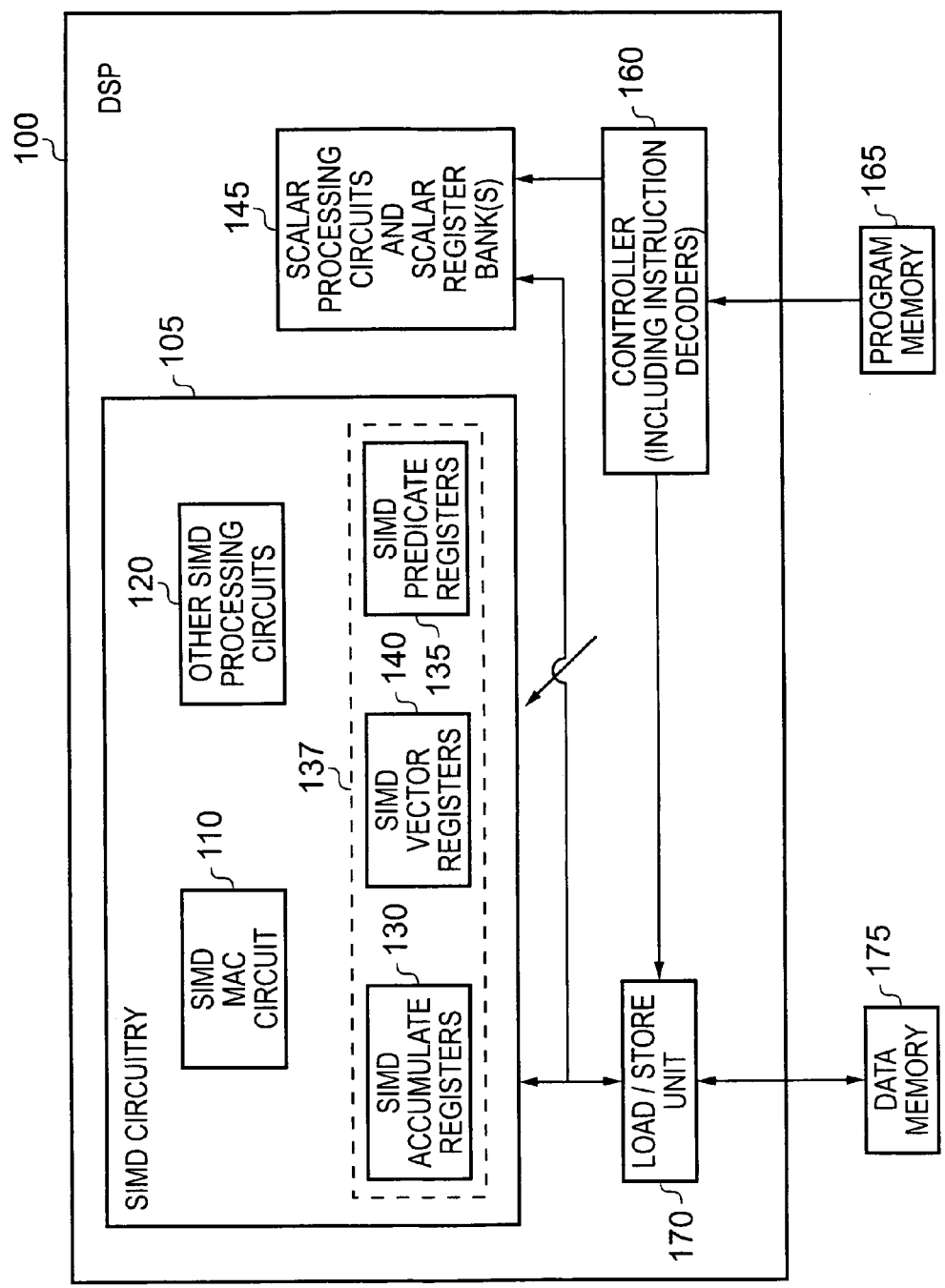
FIG. 1 is a block diagram schematically illustrating a data processing apparatus in which the techniques of embodiments of the present invention may be employed.

When the predicated MAC instruction is executed, the multiply-accumulate operation performed produces a vector accumulator output (where $0<=i<N$) where:

vacc[i]=vacc[i]+va[i]*vb[i] if vp[i]==true
vacc[i]=vacc[i]−va[i]*vb[i] if vp[i]==false FIG. 1 illustrates a data processing apparatus in accordance with one embodiment of the present invention, in this particular example the data processing apparatus taking the form of a digital signal processor (DSP) 100. Whilst the operations performed by the DSP 100 can take a variety of forms, in one embodiment the DSP may be used to perform wireless baseband processing functions. Wireless baseband places heavy demands on the processing capabilities of such an integrated circuit. The data throughputs required are large and it is important to balance the different elements provided within the DSP in order that all of the elements are used with a high degree of efficiency. As shown in FIG. 1, the DSP includes a SIMD part 105 that includes a SIMD multiply-accumulate circuit 110 and various other SIMD processing circuits 120. Both the SIMD MAC circuit 110 and the other SIMD processing circuits 120 have access to a SIMD register bank 140 storing vectors of data elements required by the SIMD processing circuits. The SIMD MAC circuit 110 also has access to one or more SIMD accumulate registers 130 used to hold accumulate data elements generated during MAC operations, and further, in accordance with embodiments of the present invention, has access to one or more SIMD predicate registers 135 storing predicate values used when performing a multiply-accumulate operation in response to a predicated MAC instruction. Whilst the registers 130, 135 and 140 may be provided in physically separate register banks, in an alternative embodiment they can be provided by a single register bank 137.

In one example, the SIMD MAC circuit 110 and the other SIMD processing circuits 120 have 32 parallel lanes of processing, each 16 bits wide, which can be used to perform multiplication, addition and shuffle operations upon arithmetic values provided from the SIMD register bank 140. 16-bit data words are taken from respective elements within one or more input value registers within the SIMD register bank 140 in order to provide the required input values to each of the lanes of parallel processing.

Often the SIMD circuits will be pipelined and in one embodiment the SIMD MAC circuit 110 forms a three stage pipeline such that the results of a calculation will be available three cycles after the calculation is issued into the pipeline.

In one embodiment the respective processing lanes are controlled by a 256-bit very long instruction word (VLIW) instruction retrieved from program memory 165 by a controller 160. This VLIW instruction will also typically include a scalar instruction used to control scalar processing circuits within a scalar part 145 of the DSP 100, the scalar processing circuits having access to one or more scalar register banks. The controller 160 will include one or more instruction decoders which are used to decode instructions within the VLIW instruction, and to send required control signals to the circuits within the SIMD part 105 and the circuits within the scalar part 145. The controller will also send control signals as and when required to the load/store unit 170 to cause data to be retrieved from the data memory 175 for storing in either the SIMD register bank 140 or the scalar register bank, or for causing data to be stored back out to data memory 175 from those register banks.

For the purposes of the description of embodiments of the present invention, the operation of the scalar processing circuits within the scalar part 145 are not relevant. However, in summary, the scalar processing circuits typically operate in parallel with the above-mentioned SIMD processing circuits and serve primarily to perform control operations. One of the scalar processing circuits may also control an address generation unit responsible for generating memory access addresses used to access data values in the data memory 175. In one embodiment, the scalar processing circuits have between one and three pipeline stages and the data memory 175 has three cycles or six cycles latency.

Considering the predicated MAC instruction of embodiments of the present invention, such an instruction may appear within the VLIW instruction retrieved by the controller 160 from the program memory 165, and upon decoding that predicated MAC instruction, control signals will be issued to the SIMD part 105, and in particular to the SIMD MAC circuit 110 to cause the SIMD MAC circuit to perform in parallel a multiply-accumulate operation in each of the N lanes of parallel processing. The predicated MAC instruction will specify a register within the predicate registers 135 containing a vector of predicate values, each value being associated with one of the lanes and dictating whether the multiply-accumulate operation performed in that lane implements a multiply-add or a multiply-subtract operation.

In alternative embodiments, the predicate values can be specified in other ways. For example, in some situations it may not be necessary to specify a separate predicate value for each lane, and certain lanes may be arranged to use the same predicate values. Further, in some embodiments the predicate values may be specified by reference to other information rather than being directly specified in a predicate register. As an example, when executing instruction sets that support conditional execution of certain instructions, it is usual to maintain a set of condition codes within the apparatus that allow the presence of those conditions to be evaluated in order to determine whether to execute an instruction or not (an example of such codes being the N, Z, C and V condition code bits maintained by ARM processors). In some embodiments the predicate values can be determined with reference to one of those condition code bits.

Figure 2:
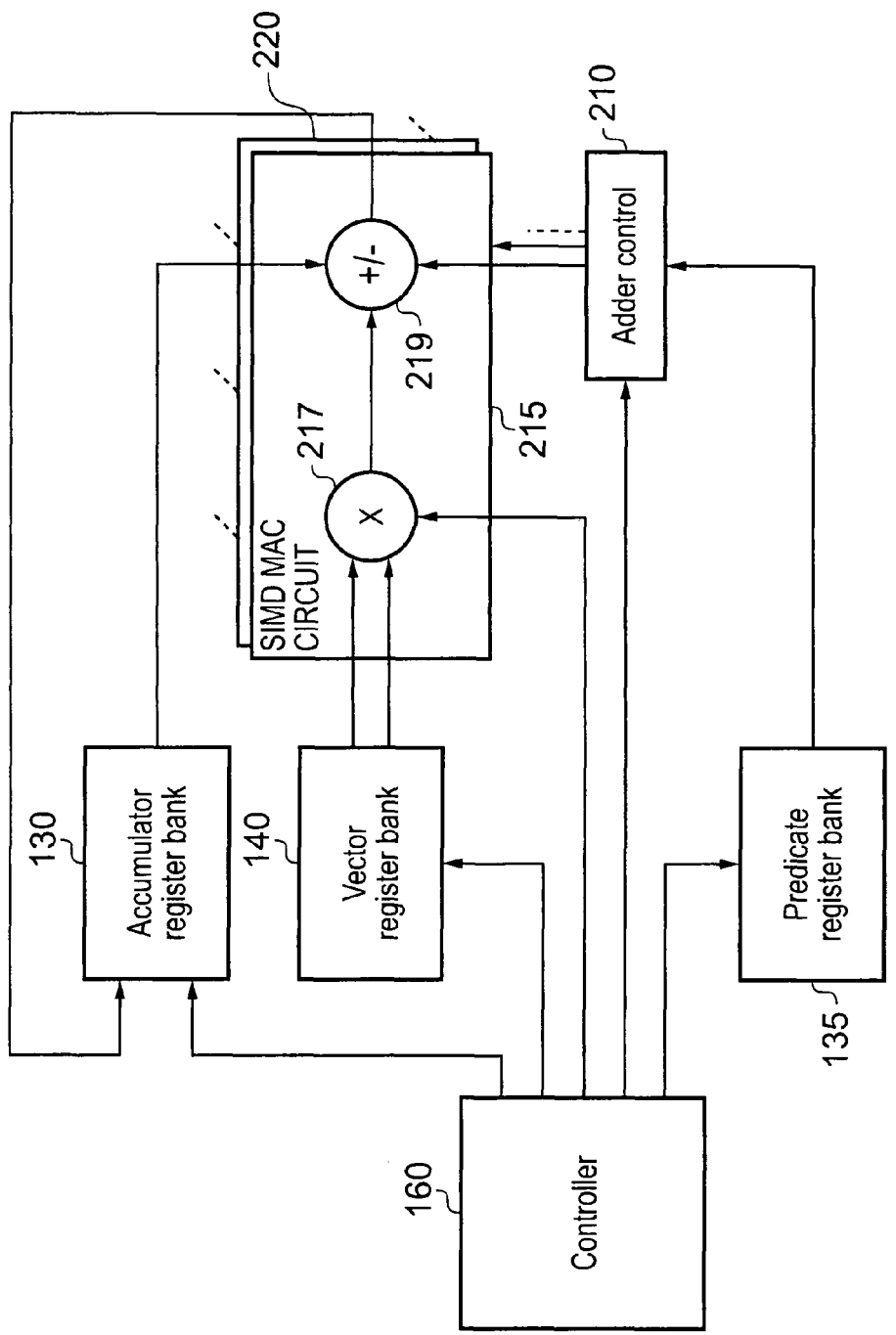
FIG. 2 is a diagram schematically illustrating how the SIMD circuitry of FIG. 1 is used to perform multiply-add and multiply-subtract operations in response to a predicated multiply-accumulate instruction in accordance with one embodiment.

FIG. 2 schematically illustrates the operation of the SIMD MAC circuit 110 when performing multiply-accumulate operations in response to the predicated MAC instruction. Ahead of executing the predicated MAC instruction, the required vectors of input data elements will be stored within the vector register bank 140 and any initial accumulate data elements will be stored as a vector in the accumulator register bank 130. Similarly, a vector of predicate values will be stored within the predicate register bank 135. It will be appreciated that there are a number of ways in which these data elements and predicate values can be stored within the register bank. For example, load instructions may be executed to load those data elements and predicate values into the registers from the data memory 175, or alternatively the relevant values may be stored directly in the registers as the output of previous operations performed by the SIMD MAC circuit 110 or the other SIMD processing circuits 120.

On decoding of a predicated MAC instruction, the controller 160 will issue a control signal to the adder control block 210 to cause the adder control block to issue control signals for each lane of parallel processing dependent on the contents of an identified register within the predicate register bank 135.

As shown schematically in FIG. 2, the SIMD MAC circuit 110 can be considered to consist of multiplier circuitry 217 and add/subtract circuitry 219 for each of a plurality of lanes of parallel processing, indicated by the numerals 215, 220 in FIG. 2. The input data elements are read from the vector register bank 140 into each lane, where they are multiplied by the multiplier 217 in order to produce a multiplication data element forwarded to the add/subtract circuitry 219. The add/subtract circuitry optionally receives an initial accumulate value from the accumulator register bank 130 and then either adds the multiplication data element to the accumulate data element or subtracts the multiplication data element from the accumulate data element in dependence on the control signal received from the adder control block 210. The resultant accumulate data element is then returned for storing in the accumulator register bank 130. Forwarding paths (not shown) may also be provided to allow the output accumulate data element to be directly returned as an input to the add/subtract circuitry for use in a subsequent MAC operation without the need to read that value from the accumulate register bank.

Figure 3:
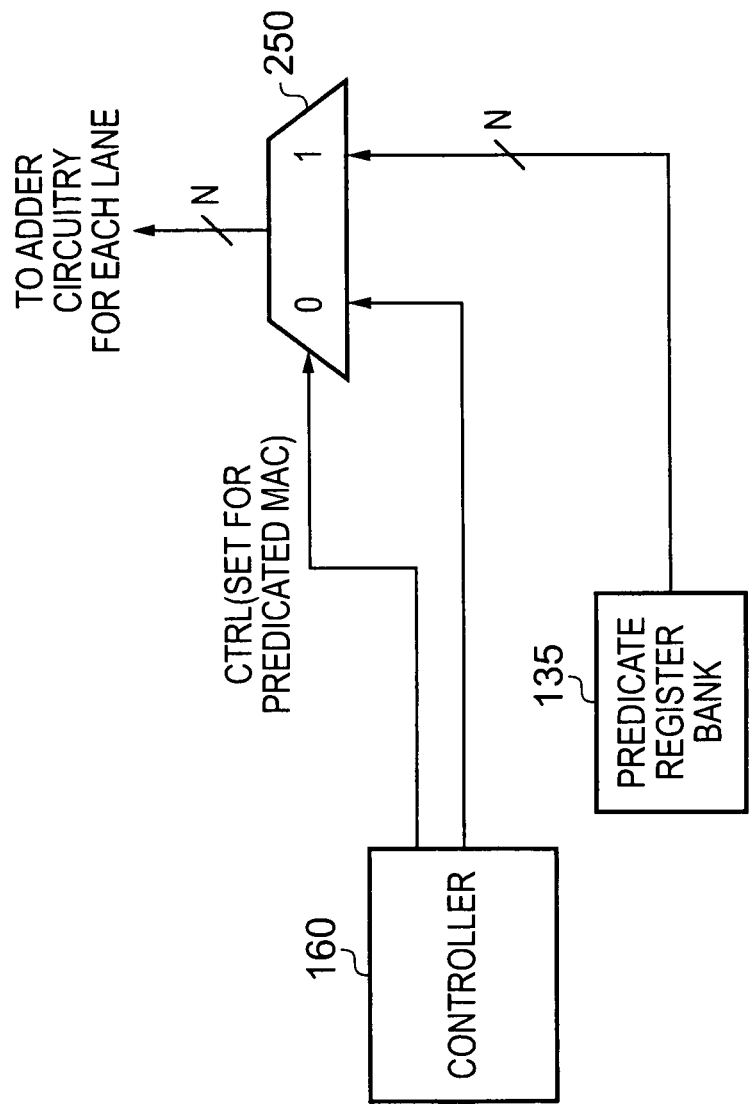
FIG. 3 schematically illustrates the operation of the adder control circuit of FIG. 2 for each lane of parallel processing within the SIMD circuitry in accordance with one embodiment.

The adder control block 210 can be constructed in a variety of ways. FIG. 3 illustrates one suitable embodiment, where the adder control block effectively comprises a two input multiplexer for each lane of parallel processing (collectively represented by the multiplexer 250 in FIG. 3). The first input of the multiplexer receives an add/subtract control signal output from the controller 160, and in the absence of a predicated MAC instruction, a multiplexer control signal will also be issued by the controller 160 to cause that first input to the multiplexer to be used to control the adder circuitry within each lane. Hence, if a multiply-add instruction is executed, the controller 160 will issue an add/subtract control signal which will be routed via the multiplexer 250 to the add/subtract circuitry 219 in each lane to cause an addition to be performed. Similarly, if a multiply-subtract instruction is executed, an add/subtract control signal issued by the controller 160 will be routed via the multiplexer to the add/subtract circuitry 219 in each lane to cause a subtraction to be performed.

However, in the event that a predicated MAC instruction is decoded, the multiplexer control signal will instead be set to cause the multiplexer 250 to select its second input for routing to the add/subtract circuitry 219. As shown in FIG. 3, this second input will be provided by the predicate register bank 135, and in particular will be provided by one of the registers within the predicate register bank as identified by the predicated MAC instruction. Assuming there are N lanes of parallel processing, this second input will hence be at least N bits in size, providing at least one predicate value for each lane of parallel processing. Hence, for each lane of parallel processing, the relevant predicate value in the vector of predicate values provided by that predicate register will be routed via the multiplexer 250 to the add/subtract circuitry 219 for that lane to control whether an addition or a subtraction is performed.

Figure 4:
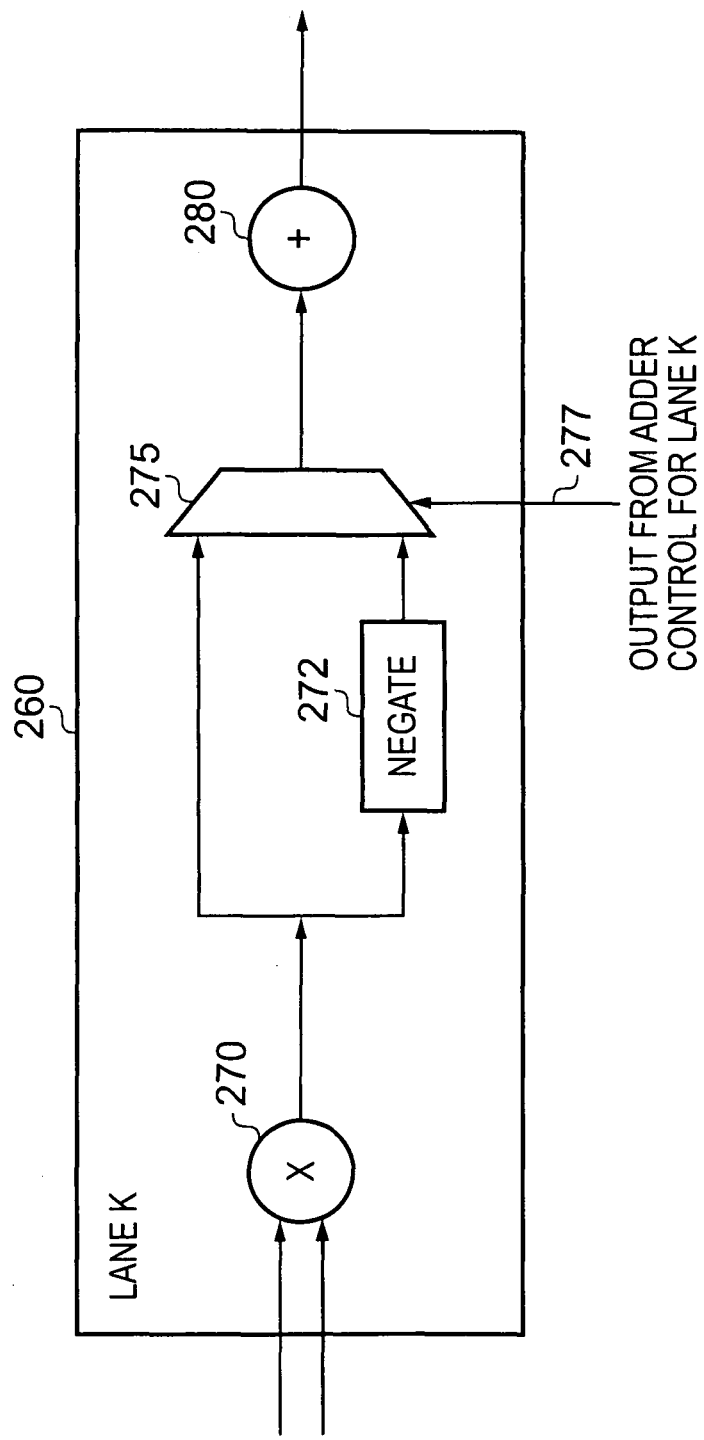
FIG. 4 illustrates how the output from the adder control circuit is used within each lane of parallel processing to control the performance of a multiply-add or a multiply-subtract operation.

There are a number of ways in which the add/subtract circuitry 219 can be arranged to be responsive to the control signals issued by the adder control block 210. FIG. 4 schematically illustrates one embodiment where the output from the multiplier 270 within each lane is negated by the negate circuitry 272, and then both the original multiplication result and the negated multiplication result are provided as inputs to the multiplexer 275, whose operation is controlled by the output from the adder control block 210. The output from the multiplexer is then input to the adder 280, which performs an addition of the output from the multiplexer and any input accumulate value. Hence, if for a particular lane of parallel processing, the predicate value indicates that a multiply-add operation should be performed, the non-negated input to the multiplexer 275 will be selected for addition. Conversely, if the predicate value indicates that a multiply-subtract operation should be performed in the corresponding lane, then the negated input to the multiplexer 275 is chosen for forwarding to the adder 280.

Figure 5:
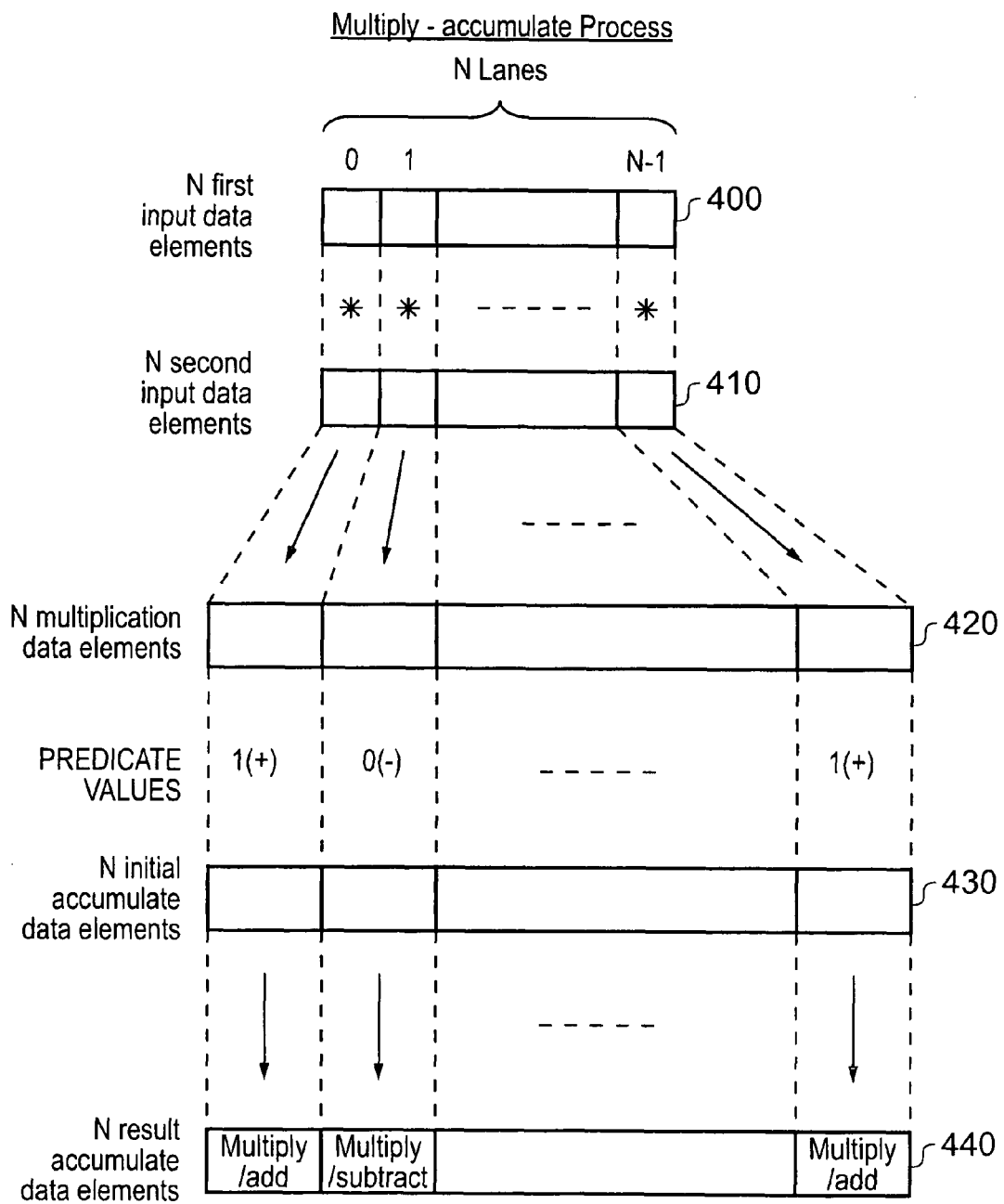
FIG. 5 is a diagram illustrating the multiply-accumulate process performed in accordance with one embodiment in response to a predicated multiply-accumulate instruction.

FIG. 5 schematically illustrates the multiply-accumulate operation performed by the SIMD MAC circuit 110 within the N lanes in embodiments of the present invention. As shown in FIG. 5, the N lanes within the multiplier circuitry receive N first input data elements 400 and N second input data elements 410, and based thereon performs the required multiplication resulting in the production of the N multiplication data elements 420. Assuming that each of the input data elements are 16-bits wide, then each of the multiplication data elements will be at least 32-bits wide.

Thereafter, the N multiplication data elements are added to, or subtracted from, N initial accumulate data elements dependent on the predicate values provided for each lane. The N initial accumulate data elements may be specified by the contents of an accumulator register identified by the predicated MAC instruction, or in one embodiment may be predetermined (for example zero).

The various additions and subtractions performed within the N lanes results in the generation of N multiply-accumulate (result) data elements 440, which are stored back to the relevant SIMD accumulator register within the accumulator register bank 130. As shown in FIG. 5, these individual result accumulate data elements will either represent the result of a multiply-add operation or a multiply-subtract operation, dependent on the predicate value applicable to the corresponding lane.

In the above example, a predicate value of "1" indicates a multiply/add operation and a predicate value of "0" indicates a multiply/subtract operation, but the meaning of these values can be reversed if desired.

The following C code provides functional models of the above described multiply-accumulate operations in terms of standard vector extracts and vector by scalar multiplies, for both a predicated multiply-accumulate instruction specifying a vector of initial accumulate values and a predicated multiply-accumulate instruction where no vector of initial accumulate values is specified:

1) Predicated MAC instruction with a vector of initial accumulate values

```
vint32L_t vcmlamlsl_s16(vint32L_t vacc, vint16_t va, vint16_t vb,
vbool16_t vp)
{
   VNEW_s32L(res);
   uint_t i;
   for (i=0; i<n; i++) {
     int_32L tmp;
     if (VGET_p16(vp,i) == true) {
       tmp = mlal_s16(VGET_s32L(vacc,i),VGET_s16(va,i),
         VGET_s16(vb,i));
     } else {
       tmp = mlsl_s16(VGET_s32L(vacc,i),VGET_s16(va,i),
         VGET_s16(vb,i));
     }
     VSET_s32L(res,i,tmp);
   }
   return res;
}
```

The first line of the above C code identifies the predicated multiply-accumulate instruction (referred to here as a multiply-add/multiply-subtract (mlamls) instruction), taking as inputs the input data element vectors va and vb, the initial accumulate vector vacc, and the predicate value vector vp. The operations performed in response to the instruction are then set out in the remainder of the C code. Firstly a result vector "res" is declared, and an integer variable i is declared. Whereas the individual data elements within the vectors va and vb are 16 bits wide, the individual data elements within the vector vacc and the vector res are 32 bits wide, in order to accommodate the multiplication result produced by multiplying two 16-bit input data elements.

Then a loop is entered, which is repeated for all values of i between 0 and N–1. As shown in the above C code, in each iteration of the loop, if the predicate value is true, then the va and vb inputs are multiplied and then added to the vacc input (mlal_s16). Otherwise, the va and vb inputs are multiplied and then subtracted from the vacc input (mlsl_s32). The result is stored as a 32-bit integer "tmp".

The VGET/VSET_* functions are used to read or write one vector element, e.g. VSET_s32L(res,i,tmp) writes the value of "tmp" to the i-th element in the vector "res".

2) Predicated MAC Instruction with No Initial Accumulate

```
vint32L_t vcmulnegl_s16(vint16_t va, vint16_t vb, vbool16_t vp)
{
   VNEW_s32L(res);
   uint_t i;
   for (i=0; i<n; i++) {
     int_32L tmp;
     if (VGET_p16(vp,i) == true) {
       tmp = mull_s16(VGET_s16(va,i), VGET_s16(vb,i));
     } else {
       tmp = neg_s32(mull_s16(VGET_s16(va,i), VGET_s16(vb,i)));
     }
     VSET s32L(res,i,tmp);
   }
   return res;
}
```

In this example, the predicated MAC instruction is referred to as a multiply/negate instruction. As shown in the above C code, if the predicate value is true, then both inputs are multiplied (mull_s16). Otherwise, both inputs are multiplied and the result is then negated (neg_s32).

As with the earlier examples, the VGET/VSET_* functions are used to read or write one vector element, e.g. VSET_s32L(res,i,tmp) writes the value of 'tmp' to the i-th element in the vector 'res'.

In the above described embodiments, the first input data elements, second input data elements, and accumulate data elements are all assumed to be real numbers. However, embodiments are not restricted to use with real numbers. For example, in an alternative embodiment, one or both of the first input data elements and the second input data elements may be complex numbers that comprise real and imaginary parts, in which event the multiply accumulate operation performed by the SIMD MAC circuit 110 within each lane will be a complex multiply-accumulate operation producing as the result accumulate data elements a vector of complex numbers, each having real and imaginary parts.

When considering the example where complex multiply-accumulate operations are performed, each of the multiplications will involve the performance of a sequence of multiply, add and subtract operations in order to produce real and imaginary parts of the corresponding complex multiplication result data element. In particular, considering the general case of va[i]*vb[i], the following computations will be performed:

Multiply real part result=vbR[i]*vaR[i]−vbI[i]*vaI[i]

Multiply imaginary part result=vbR[i]*vaI[i]+vbI[i]*vaR[i]

(where "R" denotes a real part and "I" denotes an imaginary part).

The real and imaginary multiply results will then be accumulated with the previous real and imaginary accumulate results.

Whilst in the above example both of the input data elements are complex numbers, in an alternative embodiment only one of these may be provided as complex numbers in the input vectors. For example, whilst the first input data elements may be provided as complex numbers, the second input data elements may be provided as real numbers.

In one embodiment, such a situation is treated as a special case of the complex embodiment described above, where data elements in va and vacc vectors are complex while data elements in vb are real. To perform this operation, the real vb elements may be internally converted to complex numbers as follows:

internal_vbR[k]=vb[k]
internal_vbI[k]=0 and then the complex multiply-accumulate operation can be performed as discussed above.

Accordingly it can be seen that for complex multiply-accumulate operations, two separate multiply-accumulate operations are performed as follows:

vaccR[i]=vaccR[i]+(vbR[i]*vaR[i]−vbI[i]*vaI[i])
vaccI[i]=vaccI[i]+(vbR[i]*vaI[i]+vbI[i]*vaR[i])

In one embodiment, a single predicate value can be provided to control the multiply-accumulate operation performed in respect of both the real and imaginary parts of corresponding first and second data elements. In that event the following options are possible for the two multiply-accumulate operations described above:

vaccR[i]=vaccR[i]+(vbR[i]*vaR[i]−vbI[i]*vaI[i]) if vp[i]==true
vaccR[i]=vaccR[i]−(vbR[i]*vaR[i]−vbI[i]*vaI[i]) if vp[i]==false
vaccI[i]=vaccI[i]+(vbR[i]*vaI[i]+vbI[i]*vaR[i]) if vp[i]==true
vaccI[i]=vaccI[i]−(vbR[i]*vaI[i]+vbI[i]*vaR[i]) if vp[i]==false However, in an alternative embodiment, the predicate value may comprise a first predicate value for the multiply-accumulate operation performed to produce the real part of the complex result accumulate data element, and a second predicate value for the multiply-accumulate operation performed to produce the imaginary part of the complex result accumulate data element. This can provide further flexibility in the use of the predicated multiply-accumulate instruction in association with complex numbers. In such an embodiment, the following options are possible for the two multiply-accumulate operations described above:

vaccR[i]=vaccR[i]+(vbR[i]*vaR[i]−vbI[i]*vaI[i]) if vpR[i]== true
vaccR[i]=vaccR[i]−(vbR[i]*vaR[i]−vbI[i]*vaI[i]) if vpR[i]== false
vaccI[i]=vaccI[i]+(vbR[i]*vaI[i]+vbI[i]*vaR[i]) if vpI[i]==true
vaccI[i]=vaccI[i]−(vbR[i]*vaI[i]+vbI[i]*vaR[i]) if vpI[i]==false In a yet further embodiment, two predicate values per complex number can again be used, but with those predicate values being used to independently control the two multiply operations in each of the multiply-accumulate operations. In such an embodiment, the following options are possible for the two multiply-accumulate operations described above:

vaccR[i]=vaccR[i]+(vbR[i]*vaR[i])−(vbI[i]*vaI[i]) if vpR[i]== true and vpI[i]==true
vaccR[i]=vaccR[i]+(vbR[i]*vaR[i])+(vbI[i]*vaI[i]) if vpR[i]== true and vpI[i]==false
vaccR[i]=vaccR[i]−(vbR[i]*vaR[i])−(vbI[i]*vaI[i]) if vpR[i]== false and vpI[i]==true
vaccR[i]=vaccR[i]−(vbR[i]*vaR[i])+(vbI[i]*vaI[i]) if vpR[i]== false and vpI[i]==false
vaccI[i]=vaccI[i]+(vbR[i]*vaI[i])+(vbI[i]*vaR[i]) if vpR[i]== true and vpI[i]==true
vaccI[i]=vaccI[i]+(vbR[i]*vaI[i])−(vbI[i]*vaR[i]) if vpR[i]== true and vpI[i]==false
vaccI[i]=vaccI[i]−(vbR[i]*vaI[i])+(vbI[i]*vaR[i]) if vpR[i]== false and vpI[i]==true
vaccI[i]=vaccI[i]−(vbR[i]*vaI[i])−(vbI[i]*vaR[i]) if vpR[i]== false and vpI[i]==false As an extension of the above embodiment, it would be possible to specify four predicate values per complex number to allow complete independence in the setting of the multiply-accumulate operation for the real part and the setting of the multiply-accumulate operation for the imaginary part.

In a further alternative embodiment, at least one of the first input data element and the second input data element may be floating point numbers, in which event the multiply accumulate operation performed by the data processing circuitry is a floating point multiply-accumulate operation producing as the result accumulate data element a floating point number. In such embodiments, the SIMD MAC circuit 110 will typically include floating point multiplication and addition circuitry in order to perform the required multiply-accumulate operations.

In one embodiment, only one of the first input data element and the second input data element may be floating point numbers, and the other input data element may be a fixed point number. However, in another embodiment both of the first input data element and the second input data element are floating point numbers.

From the above description of embodiments of the present invention, it will be seen that the predicated MAC instruction of embodiments of the present invention provides a particularly efficient mechanism for performing sequences of multiply-accumulate operations within a data processing apparatus, allowing the performance benefits of utilising dedicated MAC circuits to be realised, whilst also providing flexibility for performing multiply-add or multiply-subtract operations using the same instruction, under the control of a predicate value. The approach is particularly beneficial when employed in association with SIMD MAC circuitry, where multiple multiply-accumulate operations can be performed in parallel within N lanes of parallel processing, with those lanes being individually configured based on corresponding predicate values to perform either multiply-add or multiply-subtract operations. Such an approach can provide a high performance and energy efficient mechanism for performing filter operations, such as are required when processing radio signals.

Whilst the above described techniques may be performed by hardware executing a sequence of native instructions which include the above-mentioned predicated MAC instructions, it will be appreciated that in alternative embodiments, such instructions may be executed in a virtual machine environment, where the instructions are native to the virtual machine, but the virtual machine is implemented by software executing on hardware having a different native instruction set. The virtual machine environment may provide a full virtual machine environment emulating execution of a full instruction set or may be partial, e.g. only some instructions, including the instructions of the present technique, are trapped by the hardware and emulated by the partial virtual machine.

More specifically, the above-described predicated MAC instructions may be executed as native instructions to the full or partial virtual machine, with the virtual machine together with its underlying hardware platform operating in combination to provide the SIMD processing circuitry described above.

Figure 6:
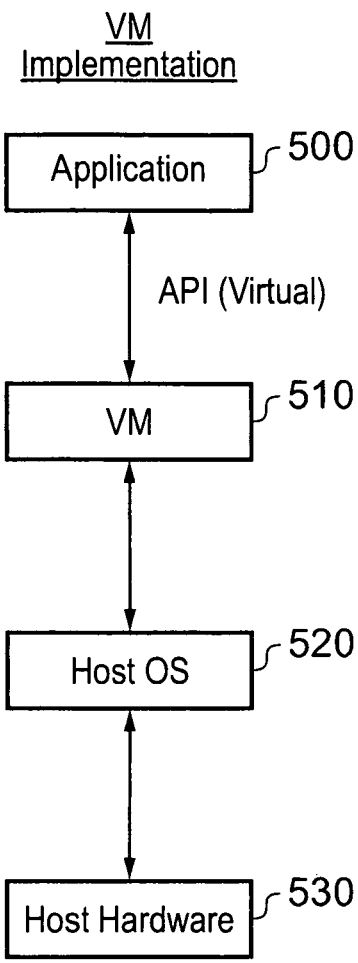
FIG. 6 is a diagram schematically illustrating a virtual machine implementation for executing program code utilising the predicated multiply-accumulate instruction of embodiments of the present invention.

FIG. 6 illustrates such a virtual machine implementation that may be used. Whilst the earlier described embodiments implement the present invention in terms of apparatus and methods for operating specific processing hardware supporting instructions concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the predicated MAC instruction described above, may be executed from within the application program 500 using the virtual machine program 510 to model their interaction with the virtual machine hardware.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:
1. A data processing apparatus comprising:
data processing circuitry responsive to control signals to perform data processing operations on at least one input data element;
instruction decoder circuitry coupled to said data processing circuitry and responsive to program instructions to generate said control signals;
said instruction decoder circuitry being responsive to a predicated multiply-accumulate instruction specifying as input operands a first input data element, a second input data element, and a predicate value, to generate control signals to control said data processing circuitry to perform a multiple-accumulate operation by:
multiplying said first input data element and said second input data element to produce a multiplication data element;
if the predicate value has a first value, producing a result accumulate data element by adding the multiplication data element to an initial accumulate data element; and
if the predicate value has a second value, producing the result accumulate data element by subtracting the multiplication data element from the initial accumulate data element.
2. A data processing apparatus as claimed in claim 1, further comprising:
at least one register bank for storing said input operands, wherein said predicated multiply-accumulate instruction identifies a register of the at least one register bank containing said predicate value.
3. A data processing apparatus as claimed in claim 2, wherein the at least one register bank comprises an input data element register bank comprising input registers for storing said first and second input data elements, and an accumulate register bank having accumulate registers for storing each initial accumulate data element and result accumulate data element.
4. A data processing apparatus as claimed in claim 1, wherein:
the data processing circuitry is SIMD data processing circuitry providing N lanes of parallel processing, where N is an integer greater than 1, and the SIMD data processing circuitry is responsive to the control signals to perform a data processing operation in parallel in each of said N lanes of parallel processing;
said predicated multiply-accumulate instruction specifies as input operands a plurality of said first input data elements forming a first vector;
said instruction decoder circuitry is responsive to the predicated multiply-accumulate instruction to generate control signals to control said data processing circuitry to perform in parallel said multiply-accumulate operation in each of said N lanes of parallel processing, such that the first input data element from said first vector that is selected for input to the multiply-accumulate operation is dependent on the lane of parallel processing in which that multiply-accumulate operation is being performed.
5. A data processing apparatus as claimed in claim 4, wherein:
said predicated multiply-accumulate instruction specifies as input operands a plurality of said second input data elements forming a second vector; and
the second input data element from said second vector that is selected for input to the multiply-accumulate operation is dependent on the lane of parallel processing in which that multiply-accumulate operation is being performed.

6. A data processing apparatus as claimed in claim 4, wherein:
said predicated multiply-accumulate instruction specifies as input operands a scalar second input data element which is then replicated within the data processing circuitry to form a second vector;
whereby the same second input data element is used in each lane of parallel processing in which said multiply-accumulate operation is being performed.

7. A data processing apparatus as claimed in claim 4, wherein:
said predicated multiply-accumulate instruction specifies as input operands a plurality of said predicate values forming a third vector; and
the predicate value from said third vector that is selected for input to the multiply-accumulate operation is dependent on the lane of parallel processing in which that multiply-accumulate operation is being performed.

8. A data processing apparatus as claimed in claim 7, wherein said third vector specifies N predicate values, such that within each of said N lanes of parallel processing the multiply-accumulate operation is independently configured to perform a multiply-add or a multiply-subtract operation.

9. A data processing apparatus as claimed in claim 4, wherein:
said predicated multiply-accumulate instruction specifies as input operands a plurality of said initial accumulate data elements forming a fourth vector; and
the initial accumulate data element from said fourth vector that is selected for input to the multiply-accumulate operation is dependent on the lane of parallel processing in which that multiply-accumulate operation is being performed.

10. A data processing apparatus as claimed in claim 9, wherein:
the data processing circuitry is SIMD data processing circuitry providing N lanes of parallel processing, where N is an integer greater than 1, and the SIMD data processing circuitry is responsive to the control signals to perform a data processing operation in parallel in each of said N lanes of parallel processing;
said predicated multiply-accumulate instruction specifies as input operands a plurality of said first input data elements forming a first vector;
said instruction decoder circuitry is responsive to the predicated multiply-accumulate instruction to generate control signals to control said data processing circuitry to perform in parallel said multiply-accumulate operation in each of said N lanes of parallel processing, such that the first input data element from said first vector that is selected for input to the multiply-accumulate operation is dependent on the lane of parallel processing in which that multiply-accumulate operation is being performed; and wherein:
said predicated multiply-accumulate instruction specifies as input operands a plurality of said second input data elements forming a second vector; and
the second input data element from said second vector that is selected for input to the multiply-accumulate operation is dependent on the lane of parallel processing in which that multiply-accumulate operation is being performed,
wherein each of the first, second and fourth vectors has N data elements.

11. A data processing apparatus as claimed in claim 1, wherein the predicated multiply-accumulate instruction further specifies as an input operand said initial accumulate data element.

12. A data processing apparatus as claimed in claim 1, wherein said initial accumulate data element is a predetermined value.

13. A data processing apparatus as claimed in claim 12, wherein said predetermined value is zero.

14. A data processing apparatus as claimed in claim 1, wherein each first input data element comprises X bits, each second input data element comprises Y bits, and each initial accumulate data element is at least X+Y bits in size.

15. A processing apparatus as claimed in claim 14, wherein X=Y.

16. A data processing apparatus as claimed in claim 1, wherein:
at least one of the first input data element and the second input data element are complex numbers that comprise real and imaginary parts; and
the multiply accumulate operation performed by the data processing circuitry is a complex multiply-accumulate operation producing as the result accumulate data element a complex number having real and imaginary parts.

17. A data processing apparatus as claimed in claim 16, wherein both the first input data element and the second input data element are complex numbers that comprise real and imaginary parts.

18. A data processing apparatus as claimed in claim 16, wherein the complex multiply-accumulate operation involves performance of a sequence of multiply, add and subtract operations in order to produce real and imaginary parts of the corresponding complex result accumulate data element.

19. A data processing apparatus as claimed in claim 16, wherein the predicate value comprises at least two predicate values used to control different parts of the complex multiply-accumulate operation.

20. A data processing apparatus as claimed in claim 19, wherein the predicate value comprises a first predicate value for the multiply-accumulate operation performed to produce the real part of the complex result accumulate data element, and a second predicate value for the multiply-accumulate operation performed to produce the imaginary part of the complex result accumulate data element.

21. A data processing apparatus as claimed in claim 19, wherein both the multiply-accumulate operation performed to produce the real part of the complex result accumulate data element and the multiply-accumulate operation performed to produce the imaginary part of the complex result accumulate data element comprise first and second multiply operations, and the predicate value comprises a first predicate value for the first multiply operation and a second predicate value for the second multiply operation.

22. A data processing apparatus as claimed in claim 1, wherein:
at least one of the first input data element and the second input data element are floating point numbers; and
the multiply accumulate operation performed by the data processing circuitry is a floating point multiply-accumulate operation producing as the result accumulate data element a floating point number.

23. A data processing apparatus as claimed in claim 22, wherein both of the first input data element and the second input data element are floating point numbers.

24. A method of processing data using data processing circuitry responsive to control signals to perform data processing operations on at least one input data element and instruction decoder circuitry coupled to said data processing circuitry and responsive to program instructions to generate said control signals, the method comprising the steps of:

decoding a predicated multiply-accumulate instruction specifying as input operands a first input data element, a second input data element, and a predicate value, in order to generate control signals; and controlling said data processing circuitry using said control signals to perform a multiple-accumulate operation by:

multiplying said first input data element and said second input data element to produce a multiplication data element;

if the predicate value has a first value, producing a result accumulate data element by adding the multiplication data element to an initial accumulate data element; and if the predicate value has a second value, producing the result accumulate data element by subtracting the multiplication data element from the initial accumulate data element.

25. A computer program product comprising at least one predicated multiply-accumulate instruction which, when run on a data processor, controls the data processor to perform the steps of the method according to claim 24.

26. A virtual machine implementation of a data processing apparatus, said virtual machine implementation being responsive to a predicated multiply-accumulate instruction specifying as input operands a first input data element, a second input data element, and a predicate value, to perform a multiple-accumulate operation by:

multiplying said first input data element and said second input data element to produce a multiplication data element;

if the predicate value has a first value, producing a result accumulate data element by adding the multiplication data element to an initial accumulate data element; and if the predicate value has a second value, producing the result accumulate data element by subtracting the multiplication data element from the initial accumulate data element.

27. A data processing apparatus comprising:

data processing means for performing, in response to control signals, data processing operations on at least one input data element;

instruction decoder means coupled to said data processing means and for generating said control signals in response to program instructions;

said instruction decoder means, responsive to a predicated multiply-accumulate instruction specifying as input operands a first input data element, a second input data element, and a predicate value, for generating control signals to control said data processing means for performing a multiple-accumulate operation by:

multiplying said first input data element and said second input data element to produce a multiplication data element;

if the predicate value has a first value, producing a result accumulate data element by adding the multiplication data element to an initial accumulate data element; and if the predicate value has a second value, producing the result accumulate data element by subtracting the multiplication data element from the initial accumulate data element.

\* \* \* \* \*